United States Patent [19]

Hart et al.

[11] Patent Number: 5,620,715
[45] Date of Patent: Apr. 15, 1997

[54] THERMOFORMING MACHINE WITH CONTROLLED COOLING STATION

[75] Inventors: James P. Hart, Portage; Wesley W. Roberts, Lake Mills; Charles G. Geurts, Cambria, all of Wis.

[73] Assignee: Penda Corporation, Portage, Wis.

[21] Appl. No.: 195,299

[22] Filed: Feb. 10, 1994

[51] Int. Cl.⁶ .................................................. B29C 51/42
[52] U.S. Cl. ..................... 425/143; 425/384; 264/40.6; 264/544; 264/237
[58] Field of Search ............................... 425/387.1, 134, 425/135, 445, 388, 383, 384, 812, 342, 143; 264/237, 348, 288.4, 44, 143, 328.14, 547, 550, 551, 544, 549, 291

[56] References Cited

U.S. PATENT DOCUMENTS

| | | | |
|---|---|---|---|
| 2,973,558 | 3/1961 | Stratton, Jr. | 264/549 |
| 3,471,601 | 10/1969 | Goetgheluck | 264/544 |
| 3,713,765 | 1/1973 | Rise | 425/384 |
| 3,744,262 | 7/1973 | Bose | 425/388 |
| 3,867,085 | 2/1975 | Lynch | 425/384 |
| 3,867,088 | 2/1975 | Brown et al. | 425/504 |
| 3,868,209 | 2/1975 | Howell | 425/388 |
| 3,925,140 | 12/1975 | Brown | 156/382 |
| 3,962,392 | 6/1976 | Conner | 425/388 |
| 4,079,232 | 3/1978 | Brokoff et al. | 264/550 |
| 4,086,045 | 4/1978 | Thiel | 425/388 |
| 4,128,369 | 12/1978 | Kemerer | 425/113 |
| 4,257,756 | 3/1981 | Gasson | 425/384 |
| 4,267,140 | 5/1981 | Meeker | 264/291 |
| 4,552,709 | 11/1985 | Koger, II et al. | 264/504 |
| 4,555,377 | 11/1985 | Whiteside et al. | 264/292 |
| 4,666,394 | 5/1987 | Wakamiya | 425/342.1 |
| 5,167,781 | 12/1992 | Kemerer | 264/348 |
| 5,263,839 | 11/1993 | Robinson et al. | 425/387.1 |

FOREIGN PATENT DOCUMENTS

| | | | |
|---|---|---|---|
| 365951 | 5/1990 | European Pat. Off. | 264/544 |

OTHER PUBLICATIONS

Brown, John, "The Reliable Ones: R–Series Rotary Thermoformers." Plastics Machinery. (Brochure) no month, year.
G. Hook "Why Solid–State Mold Temperature Control" Plastics Technology, Nov., 1980, pp. 77–80.

*Primary Examiner*—Catherine Timm
*Attorney, Agent, or Firm*—Lathrop & Clark

[57] ABSTRACT

A four-station rotary thermoformer has a rotary carriage which transports a sheet of thermoplastic material clamped on a subframe through a load/unload station; a heating station; a forming station where the sheet is molded; and a cooling station removed from the mold where the part is cooled on the subframe. The molded sheet is cooled in a cavity which has a lower portion mounted on a lift which travels vertically to engage against an upper portion and enclose the sheet for cooling. A multiplicity of air vents discharge cooling air into the cavity. Cooling air leaves the cavity through recirculation duct. The supply of air within the cooling cavity results in a uniform current of air against the article's surface, thus providing uniform cooling. A programmable controller controls the supply of cooling air and receives input from an infrared sensor which detects the temperature of the thermoformed article and also receives information from a sensor of the cooling air temperature. The programmable controller is programmed to provide a cooling cycle consisting of a three-parts. In the first part, the air is recirculated using the heat capacity of the recirculating air in the air supply system to start cooling at a low rate. During the second part, the flow of cooling air temperature is lowered until a pre-determined maximum cooling rate is reached and held for a selected time. During the third part, the cooling air is again recirculated.

31 Claims, 6 Drawing Sheets

THERMOFORMING MACHINE WITH CONTROLLED COOLING STATION

FIELD OF THE INVENTION

This invention relates to thermoforming machines and methods in general and thermoforming machines employing cooling in particular.

BACKGROUND OF THE INVENTION

In the thermoforming process a sheet of thermoplastic material is heated until it becomes soft and moldable, but not fluid. The heated sheet is held against a mold, whereupon a vacuum is drawn between the mold and the plastic sheet, drawing the sheet down onto the mold, and causing the thermoplastic sheet to conform to the mold's surface. Thermoforming molds are typically fabricated of aluminum and water cooled. Thus, when a hot sheet of plastic comes into contact with the mold surfaces, it is cooled and retains the shape of the mold. Upon removal from the mold, the thermoformed article is allowed to further cool to approximately room temperature. Then the article is trimmed to leave only the desired molded shape.

Thermoforming may be used to fabricate articles from thick gauge stock. For the purposes of this application, thick gauge stock is defined to be thermoplastic material in the range of 60 thousandths to four-tenths of an inch thick or more. Articles commonly fabricated from such thick gauge stock include pallets, truck bed liners, utility containers, playground slides and numerous other articles.

A typical thermoforming machine known as a four-station rotary machine has four stations equally spaced about a circle. A carriage is positioned over the stations and has four subframes. Each subframe has pneumatically controlled clamps which clamp a sheet of plastic to each subframe.

The process of forming a thermoformed plastic article starts with loading an extruded thermoplastic sheet of a selected thickness into a subframe on the carriage. This operation is accomplished at a load/unload station. Once the sheet is loaded, the machine (normally under automatic control) rotates the carriage ninety degrees, bringing the sheet of plastic into position over a first heater. The heater normally consists of either electrical or gas radiant heaters which are positioned below the clamped sheet of plastic. After the sheet has been partially heated, it is rotated to a second heating station, again ninety degrees along the circular path of the carriage. Here, the sheet is brought to the final forming temperature, whereupon the sheet is rotated and brought into alignment with the forming station.

At the forming station, a water-cooled mold is brought up into contact with the sheet, normally forming an air-tight seal about the edge of the sheet with the edges of the mold. Air is drawn through small holes drilled through the surface of the mold to evacuate air from between the sheet and the mold. Thus, atmospheric pressure forces the plastic sheet against the mold cavity. After being allowed to cool on the mold, the sheet is removed from the mold, normally by injecting air through the vacuum holes to force the molded article off the mold.

From the forming station, the subframe containing the molded article is rotated on the carriage back to the load/unload station where the molded article is removed from the subframe clamps and replaced by a fresh sheet of thermoplastic material. After removal from the rotary thermoforming machine, the plastic article is often rough-trimmed. The article is then clamped in a fixture for final cooling which takes ten to fifteen minutes, depending on the thickness of the article and ambient air temperatures. Then, the fully cooled article is trimmed to final size.

The capital cost of the thermoforming machine represents a significant contribution to the final cost of the article manufactured. Another significant contribution to the cost of the article is the cost of the water-cooled aluminum mold on which the article is fabricated. Thus, in the past, efforts to improve the efficiency and reduce the cost of production of thermoformed plastic articles have endeavored to increase the number of items manufactured in a given amount of time on the thermoforming machine.

In many instances, the limiting factor in machine speed is found to be the rate of cooling of a thermoformed article. Plastic is not a highly thermally conductive material, and even on a water-cooled aluminum mold, cools at a relatively slow rate. An additional problem is that running the water-cooled mold at too low a temperature can result in the fabrication of inferior articles, caused by the too-rapid chilling of the portions of the plastic sheet which touch the mold first. Thus, the mold temperature is normally a function of process control. It is set at the level necessary to fabricate a high quality article, and is not readily adjustable to improved through-put by accelerated cooling.

In pursuit of increased production of thermoformed articles on a thermoforming machine, processes have been developed for cooling the molded article on the mold by spraying the surface of the article opposite the mold surface with cooling vapors, such as liquid carbon dioxide and liquid nitrogen. While these liquids can achieve a rapid cooling, they do so at considerable additional cost, both due to the material used and the additional cost of handling large quantities of cryogenic liquids and the evolved suffocating gases.

Another approach has been to position fans or air conditioning units over the mold. To the extent that cooling is done while the article is still on the mold to prevent distortion, the cooling is done in parallel with the molding step. This requires that the article remain on the mold until the cooling is completed. As subsequent articles may not be formed while the articles in such a process are cooling on the mold, the overall reduction of molding time is limited by these methods.

Yet another approach to increasing cooling has been a cooling station spaced from the mold and on the thermoforming machine. Such cooling stations have had a multiplicity of fans spaced about the part to blow ambient air on the part. Such an approach is limited in the rate of cooling that is possible and is prone to part distortion What is needed is a thermoforming machine which can achieve higher through-puts by use of on-machine cooling without substantial cost increase or product distortion.

SUMMARY OF THE INVENTION

The thermoforming machine of this invention employs a four-station rotary thermoformer. The rotary thermoformer has a load/unload station, a heating station, a forming station and a controlled cooling station. A rotary carriage has four clamping subframes which rotate to successively position clamped sheets of thermoplastic within each station for a desired period of time. The controlled cooling station has a cavity formed by an upper portion positioned above the molded article and a lower portion mounted on a lift beneath the molded sheet which moves to enclose the molded sheet once it is in position within the cavity. A multiplicity of air vents are positioned above and below the molded sheet through which cooling air is supplied. The lower portion has an upwardly extending peripheral wall which surrounds the subframe. The upper edge of the peripheral wall is formed of a flexible material and partially seals the lower portion to the upper portion to enclose the cavity.

Cooling air is directed into the cavity interior and removed by ducts for recirculation. The recirculation is controlled by a controller which controls the temperature of the cooling air. The controller controls the temperature by either a flow of coolant water through a heat exchanger or by mixing cold ambient air in to the recirculating air. The controller may also substitute cold ambient air for the recirculating air. The control of the supply of air within the cooling cavity results in a uniform current of air, the temperature of which varies with time under computer control. The air blows against the formed article's surface, providing uniform controlled rapid cooling.

The programmable controller controls the supply of cooling air and may receive input from an infrared sensor which senses the temperature of a thermoformed article within the controlled cooling station. The programmable controller also receives information from a sensor which senses the cooling air temperature. The programmable controller is programmed to provide an adjustable cooling cycle consisting of a three-pan cycle. In the first part, the air is recirculated using the heat capacity of the recirculated air in the air supply system to initiate cooling at a low rate. During the second part, the flow of cooling air temperature is lowered until a pre-determined maximum cooling rate is reached and held for a selected time. During the third part, the cooling air is again recirculated leading to a slowing of the rate of cooling of the article.

Cooling air may be obtained by using ambient outside air during the winter in northern climes. During the summer, or in southern climes, the cooling air may be obtained from a convenient heat sink, such as the plant's water supply. If no heat sink is convenient and ambient air is not sufficiently cool, conventional air conditioners can be used to supply the cooling.

It is an object of the present invention to provide a thermoforming machine with a higher through-put.

It is another object of the present invention to provide a thermoforming machine which produces thermoformed articles which may be finish-trimmed as they are removed from the machine.

It is a further object of the present invention to provide a method of thermoforming thick gauge plastic sheet with improved productivity.

It is yet another object of the present invention to provide a thermoforming machine and process which provides distortion-free, on-machine cooling of thermoformed articles.

It is a still further object of the present invention to provide a thermoforming machine which employs a controller in combination with sensors to optimize the cooling of a thermoformed article on the machine.

Further objects, features, and advantages of the invention will be apparent from the following detailed description when taken in conjunction with the accompanying drawings.

DESCRIPTION OF THE PREFERRED EMBODIMENT

Figure 1:
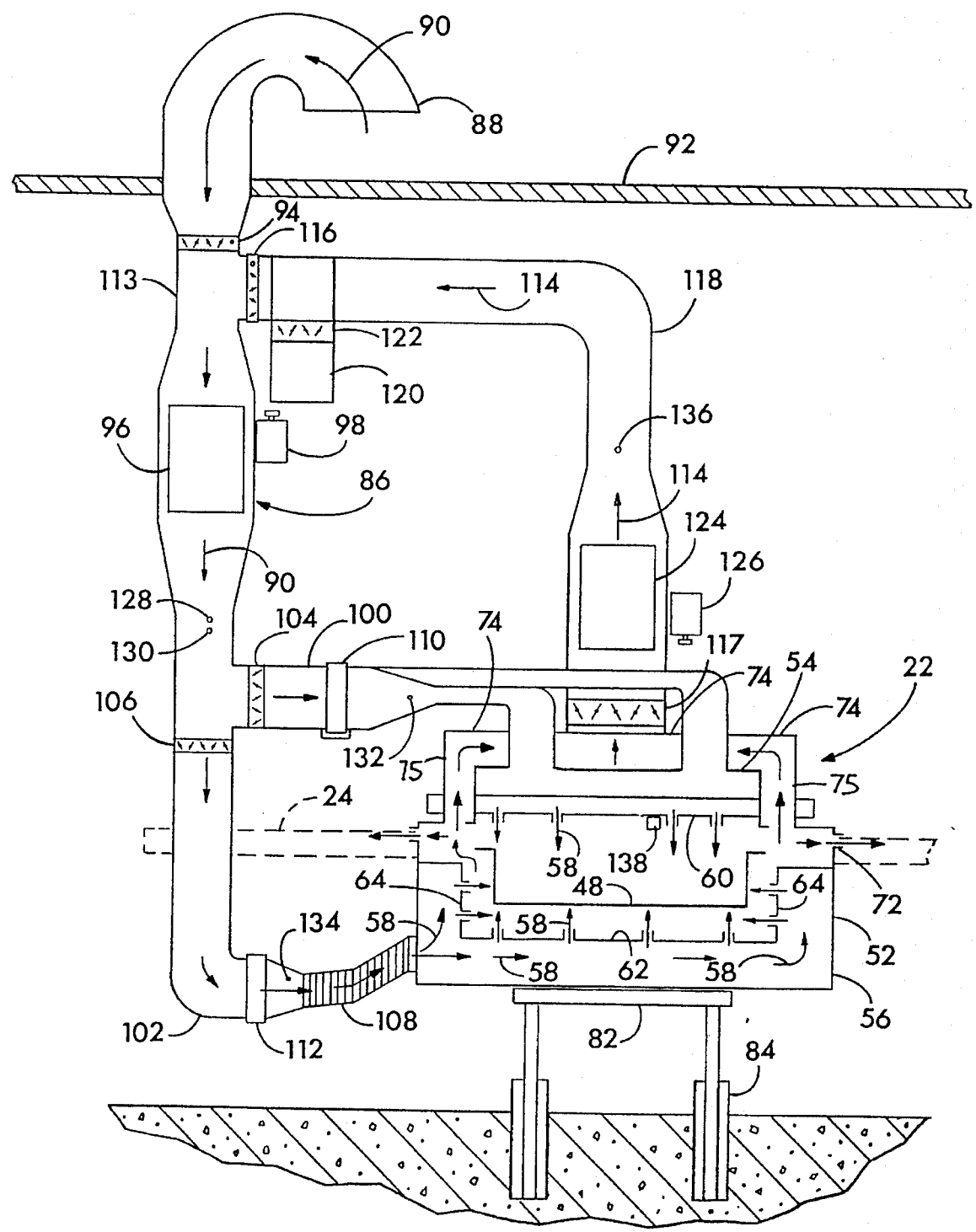
FIG. 1 is a side-elevational, somewhat schematic view of the controlled cooling station of the thermoforming machine of this invention.
Figure 2:
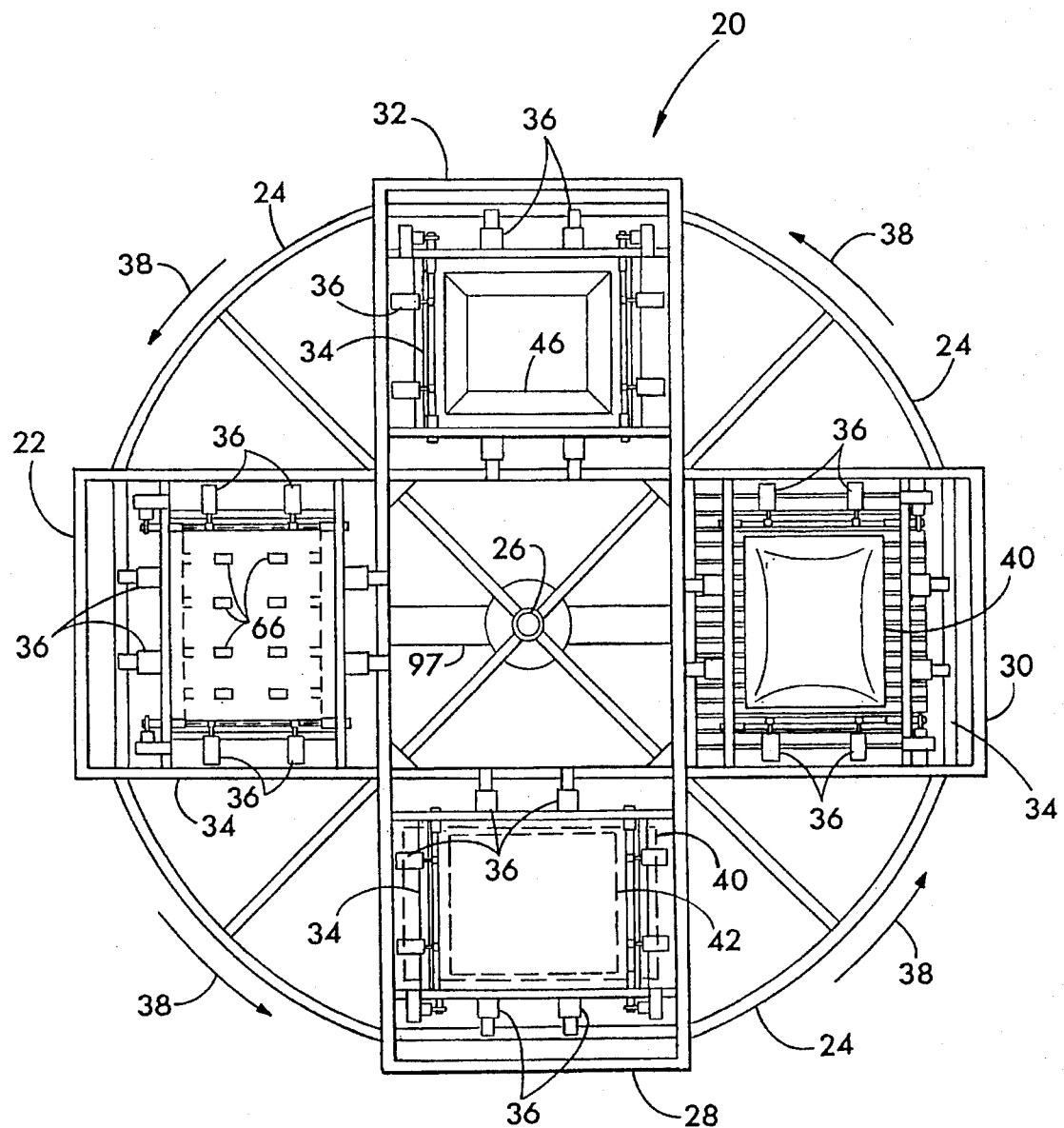
FIG. 2 is a somewhat schematic top plan view of the thermoforming machine of this invention.

Referring more particularly to FIGS. 1–6, wherein like numbers refer to similar parts, a preferred embodiment of the thermoforming machine of the invention employing a controlled cooling station is shown in FIG. 2. The thermoforming machine 20 is of the rotary type which employs a carriage 24, also known as a T-former ring, which rotates on a central pivot 26 which is mounted to the machine frame 97. The thermoformer 20 has four stations, a load/unload station 28, a heating station 30, a forming station 32 and a controlled cooling station 22. The carriage 24 has four subframes 34. Pneumatic clamps 36 are mounted to each subframe 34 and are operable to clamp a sheet of thermoplastic material to the subframe for progression through the four stations of the machine 20. The subframes 34 are mounted in an X-pattern to form the carriage 24. The carriage 24 rotates as shown by arrows 38.

Figure 6:
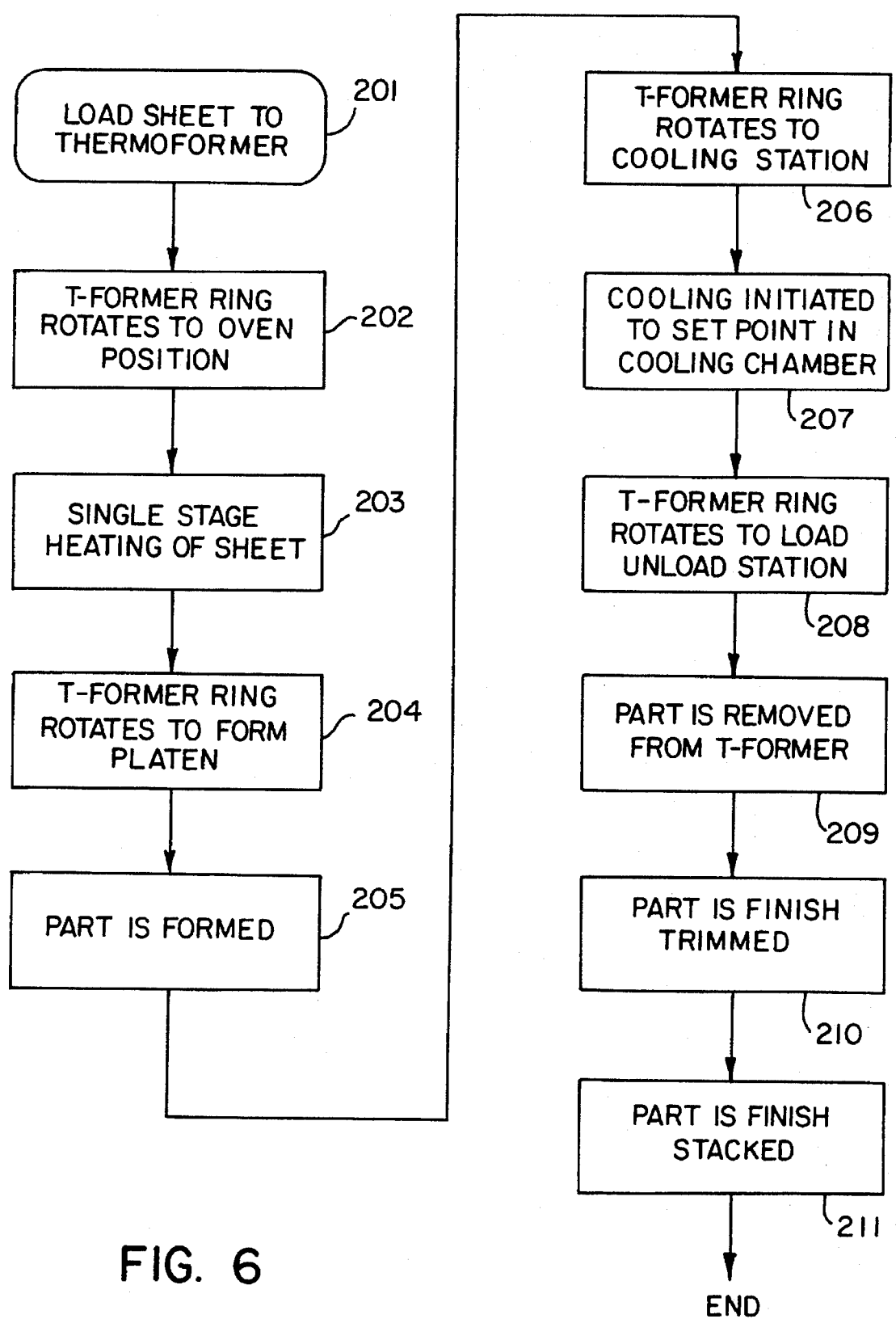
FIG. 6 is a flow diagram of the method of this invention employing an on-machine cooling station.

The operation of the thermoformer 20 is shown in the flow diagram of FIG. 6. The first step 201 in thermoforming a plastic article is to load a sheet of extruded thermoplastic material beneath the subframe 34 positioned above the load/unload station 28. Loading a sheet of thermoplastic material is accomplished by placing the sheet 40 on a table 42 which positions the sheet of plastic 40 for engagement by actuation of the pneumatic clamps 36, which clamp the plastic sheet 40 into the subframe 34.

The second step 202 in thermoforming an article, as shown in FIG. 6, is to rotate the carriage or T-former ring 24 to the heating station 30, shown in FIG. 2, where the sheet 40 is heated, as shown in the third step 203. After the sheet has been rendered formable by the radiant heaters of the heating station 30, in the fourth step 204 the carriage 24 rotates the heated sheet 40 to the forming station 32, where, in the fifth step 205, the article is formed. The article is formed by bringing a form platen containing a water-cooled mold 46 against the heated plastic sheet (not shown for clarity) at the forming station 32. The mold has a multiplicity of holes which are connected to a source of vacuum which draws the air between the mold 46 and the heated plastic sheet (not shown).

The withdrawal of the air allows atmospheric pressure to force the sheet against the mold's surfaces. Here, the plastic chills to form a thermoplastic article 48, as shown in FIG. 1. After forming, the article 48, still an integral portion of the sheet 40, and still clamped within the subframe 34, is removed from the mold 46, normally by injecting air through the vacuum holes and moving the mold 46 away from the subframe 34.

The carriage 24 then rotates the formed article 48 in the sixth step 206 to the controlled cooling station 22. Here the article is cooled on all sides by an even flow of cooling air under the control of a controller 50, indicated in FIG. 3. As indicated in FIG. 6, after the article in the seventh step 207 has been cooled to a desired temperature in the controlled cooling station, in the eighth step 208 the carriage 24 rotates the article to the load/unload station 28 where the molded article is removed from the carriage in the ninth step 209 and replaced by a new sheet 40 and the forming operation on the machine 20 is repeated for that sheet.

Once removed from the machine 20, in the tenth step 210 the thermoformed article 48 is trimmed from the sheet 40 from which it was formed. This trimming operation (not shown) may be performed by hand or with robotically controlled routers. The trimming operation also may be accomplished by a trim die which cuts the article 48 from the sheet 40 in a single punching operation. After trimming, in the eleventh step 211 the finished articles are then stacked for inventory or delivery to a customer.

Figure 5:
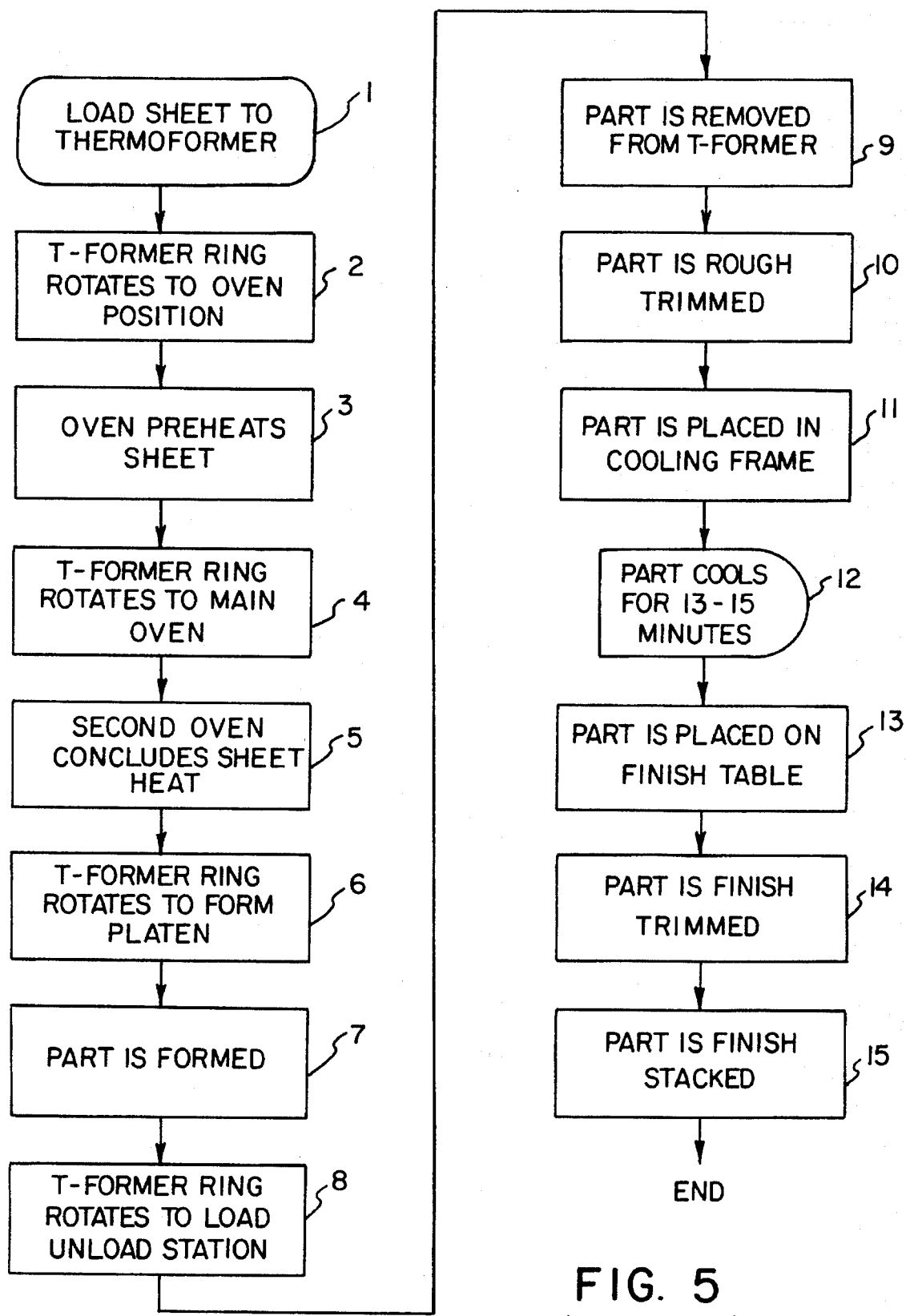
FIG. 5 is a flow diagram of the prior art method of thermoforming thick gauge plastic articles.

The production method illustrated by the flow chart of FIG. 6 may be contrasted with the prior art manufacturing process, as illustrated by FIG. 5.

In considering FIGS. 5 and 6, it should be understood that all the stations of the thermoforming machine 20 are normally occupied by sheets so that with each rotation of the carriage 24, a new thermoformed article 48 is manufactured. Thus, the time occupied at each of the stations must be the same. In the prior art machine and method, as illustrated in FIG. 5, the process step which took the longest time and which therefore controlled the rate at which articles were manufactured was the step 7 wherein the article is formed.

Inherent in forming the article is that the plastic sheet must be cooled sufficiently in the mold to hold the shape imparted to the sheet by the mold. Under the prior art process, the article was removed from the machine directly after forming. When removed from the machine the article was separated from the supportive subframe which held the peripheral edge of the plastic sheet from which the article was formed. In order to sustain removal from the subframe, the formed article must be sufficiently cool to be self-supportive to prevent distortion as it is removed from the machine and rough-trimmed. In the process of this invention, illustrated in FIG. 6, the article is retained in the subframe after removal from the mold 46, and cooled to approximately ninety degrees Fahrenheit in the controlled cooling station, hence less cooling is required on the mold. By utilizing a separate cooling station the duration of the molding step, which in the prior art process illustrated in FIG. 5 is the limiting step, may be shortened. This speeds up the entire process.

Figure 4:
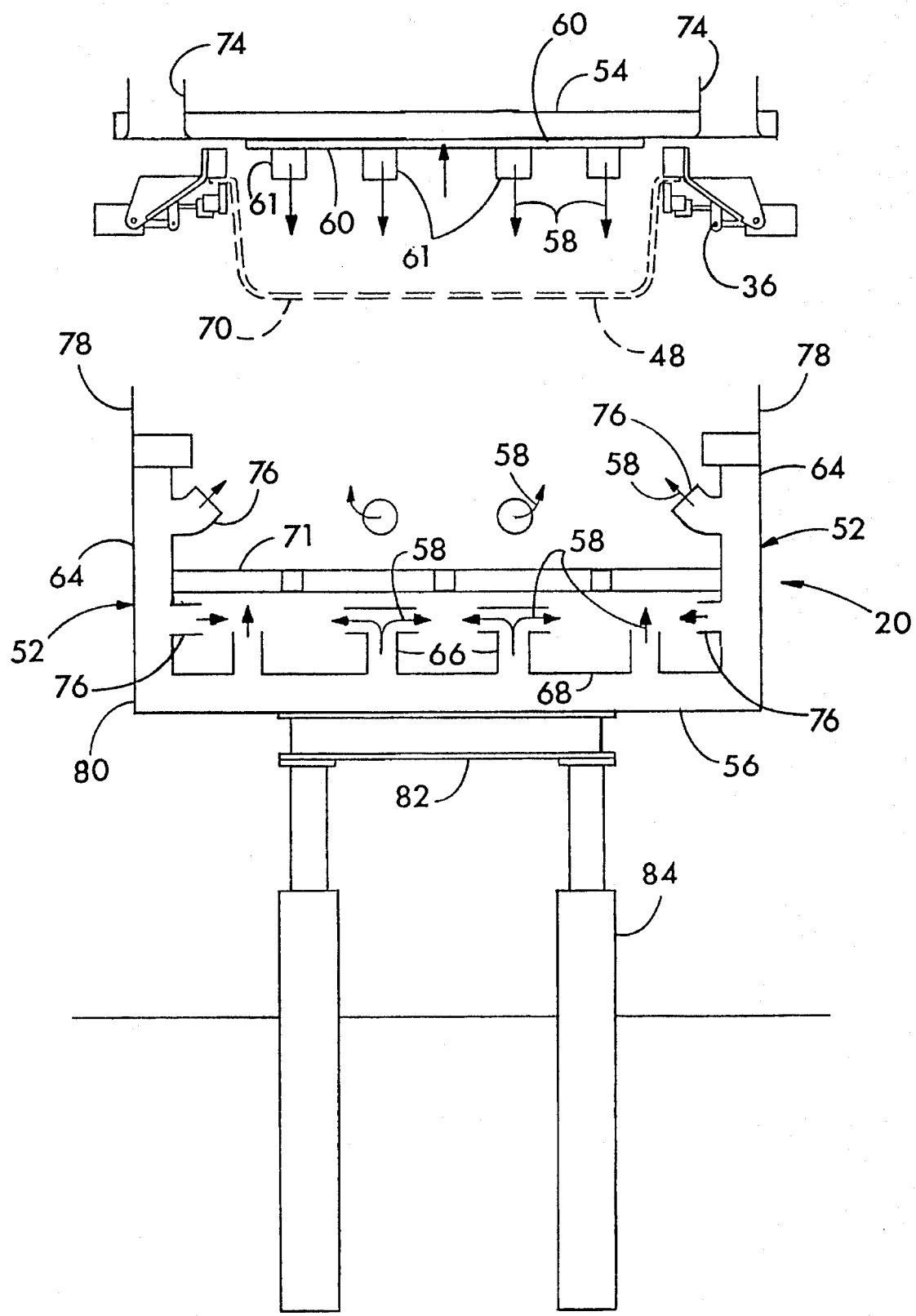
FIG. 4 is a detailed, side-elevational, somewhat schematic view of the controlled cooling station and cavity of the thermoforming machine of FIG. 1.

An example of the process time saved between the prior art process and the improved process of this invention is illustrated in the thermoforming of plastic truck bed liners. Truck bed liners are normally thermoformed of high density polyethylene with a starting sheet thickness of approximately a quarter of an inch. Using the prior art process illustrated in FIG. 5, thirteen articles per hour can be produced while retaining a high quality finished product. Similar articles were produced on an apparatus employing the process of FIG. 6, which utilizes a controlled cooling station 22 as illustrated in FIGS. 1 and 4. The test machine was able to manufacture twenty-two articles with the same quality in the finished article in one hour. This increase of approximately seventy percent represents a considerable cost savings through more efficient utilization of the machine 20.

However, the benefits of the process illustrated in FIG. 6 are not limited to increased machine utilization. The articles, as they leave the machine 20, after having been cooled in the controlled cooling station 22, are approximately one hundred degrees cooler than the articles fabricated by the prior art process illustrated in FIG. 5 on the prior art machine (not shown). Thus, under the prior art process, it is necessary to rough-trim the article, then place the article in a jig or cooling frame and allow the article to air cool for thirteen to fifteen minutes, whereupon a second trim operation was required to produce the finished article.

Because, under the old process of FIG. 5, a part was being produced approximately every four and a half minutes, three or four cooling frames were required to hold the parts flow. Thus, the use of the process of this invention on the machine 20 eliminates the requirement for the cooling frames and eliminates the necessity of the rough trim. This improved flow of materials allows the same or fewer personnel to operate the machine 20 and the trimming process associated therewith. Thus, not only are seventy percent more parts per hour made on the thermoforming machine 20, but also fewer manufacturing man hours per part are required. The process of FIG. 6 employing the improved machine 20 improves both the utilization of capital in terms of the machine 20 and reduces labor input per part, substantially increasing manufacturing productivity.

Such a quantum productivity leap will improve the competitiveness of the heavy gauge thermoforming industry.

As shown in FIGS. 1 and 4, the controlled cooling station 22 has a cooling cavity 52 with an upper cooling plenum 54 and a lower cooling plenum 56. The upper plenum 54 and the lower plenum 56 supply cooling air, indicated by arrows 58, to the cavity 52. The cooling air 58 enters the cavity 52 through vents 61 which open out of the upper surface 60 as well as through vents in a lower surface 62, and peripheral side surfaces 64. The lower surface vents are not required, and in some cases it may be desirable to eliminate them. For example where the controlled cooling station will be used on a variety of parts the upper and lower plenums will be adjustable or replaceable so they can be made to conform to a particular part for optimum cooling performance. The ease of adjusting the lower plenum is facilitated by employing side vents 76 only on the lower portion of the cavity 52.

Because the thermoformed article 48 is still relatively warm when it leaves the mold, it may be desirable to support portions of the article, such as the article lower surface 70, while it is being cooled within the cooling cavity 52. For this purpose, as shown in FIG. 4, a support rack 71 may be positioned in the cooling cavity 52 which underlies and engages the bottom 70 of the molded article 48. The support rack 71, together with the clamping mechanisms 36 which hold the plastic sheet 40 in the subframe 34, prevent distortion of the article until it can be sufficiently cooled to no longer need support.

In prior art on-machine cooling processes, where cooling air was blown at the product, the air tended to form cold spots on the product which resulted in thermal distortion. In the cooling cavity 52, shown in FIG. 4, the enclosed nature of the cavity surrounding the product results in a uniform flow of cooling air which rapidly enters and exits the cavity 52. Thus a turbulent cool air environment is achieved which is conducive to rapid heat transfer between the cooling air 58 and the thermoformed article 48. At the same time, localized cooling by the direct impingement of cool air is minimized. For example, the air inlets 66 along the central portion 68 of the lower surface 62 of the cavity 52 have T-shaped exit ports 68 which avoid the direct impingement of cooling gases on the lower surface 70 of the thermoformed article 48.

The cooling gases, as shown in FIG. 1, flow around the article 48 and exit either through sidewall gaps 72 or preferably through the return plenum 74. The return plenum 74 is comprised of a number of return ducts 75 which open into the cooling cavity 52 and withdraw air which has exchanged heat with the article 48. As shown in FIG. 4, the side nozzle 76 may be rotated to redirect the flow to conform to a particular thermoformed article 48. A resilient flap 78 may extend from the sidewalls 64 in order to form a seal with the upper surface 60. The resilient side flaps 78 are not essential and will preferably be omitted, but in some cases may add flexibility to thermoforming articles 48 of varying sizes.

The lower portion 80 of the cavity which forms the lower cooling plenum 56 is mounted on a lift 82 which is raised and lowered on hydraulic or pneumatic cylinders 84. The lift 82 extends between a lowered position, shown in FIG. 4, in which the cooling cavity 52 is opened, and a elevated position, shown in FIG. 1, in which the cooling cavity 52 is closed. The position of the lift 82 is controlled by the controller 50 so that the lower portion 80 of the cavity 52 does not interfere with the movement of the thermoformed article 48 on the carriage 24 into the controlled cooling station 22.

The supply of cooling air to the controlled cooling station 22 may be supplied by conventional air conditioning units. However, an air supply system similar to the air supply system 86 shown in FIG. 1 will preferably be employed. This system 86 avoids the cost and energy usage associated with conventional air conditioning units.

The air supply system 86 has an air intake 88 which intakes air (shown by arrows 90) from the outside of the building, here shown above the building roof 92. The outside air passes through a motorized intake damper 94 which controls the flow of outside air 90 into the air supply system 86. The air is drawn by an intake fan 96 which is driven by an intake fan motor 98. The fan 96 is normally of fixed speed and capability and is operating at all times while thermoformer 20 is in operation. The intake air 90 is then split to an upper plenum duct 100 and a lower plenum duct 102. The upper plenum duct has a damper 104 which may be power driven or manually adjusted. The lower plenum duct 102 has a damper 106 which likewise may be manually or automatically adjustable and controls the flow of air to the lower plenum duct 102 which leads into the lower plenum 56. The lower plenum has a flexible section of duct 108 which accommodates the motion of the lower portion 80 of the cavity 52 on the lift 82.

In northern climes, for more than half the year the outside air temperature will normally be sufficiently cool to be used directly inasmuch as air temperatures of as high as seventy degrees Fahrenheit are sufficient in most cases to cool the thermoformed article 48.

In southern climes and during the summer in northern climes, additional cooling is required. This is provided in the air system 86 by means of an upper heat exchanger 110 disposed in the upper duct 100 and a lower heat exchanger 112 disposed in the lower duct 102. The heat exchangers, while they may be the conventional evaporators of a conventional air conditioning system, will preferably be heat exchangers exchanging heat with a convenient source of heat sink such as a near-by body of water or the manufacturing plant water supply.

Figure 3:
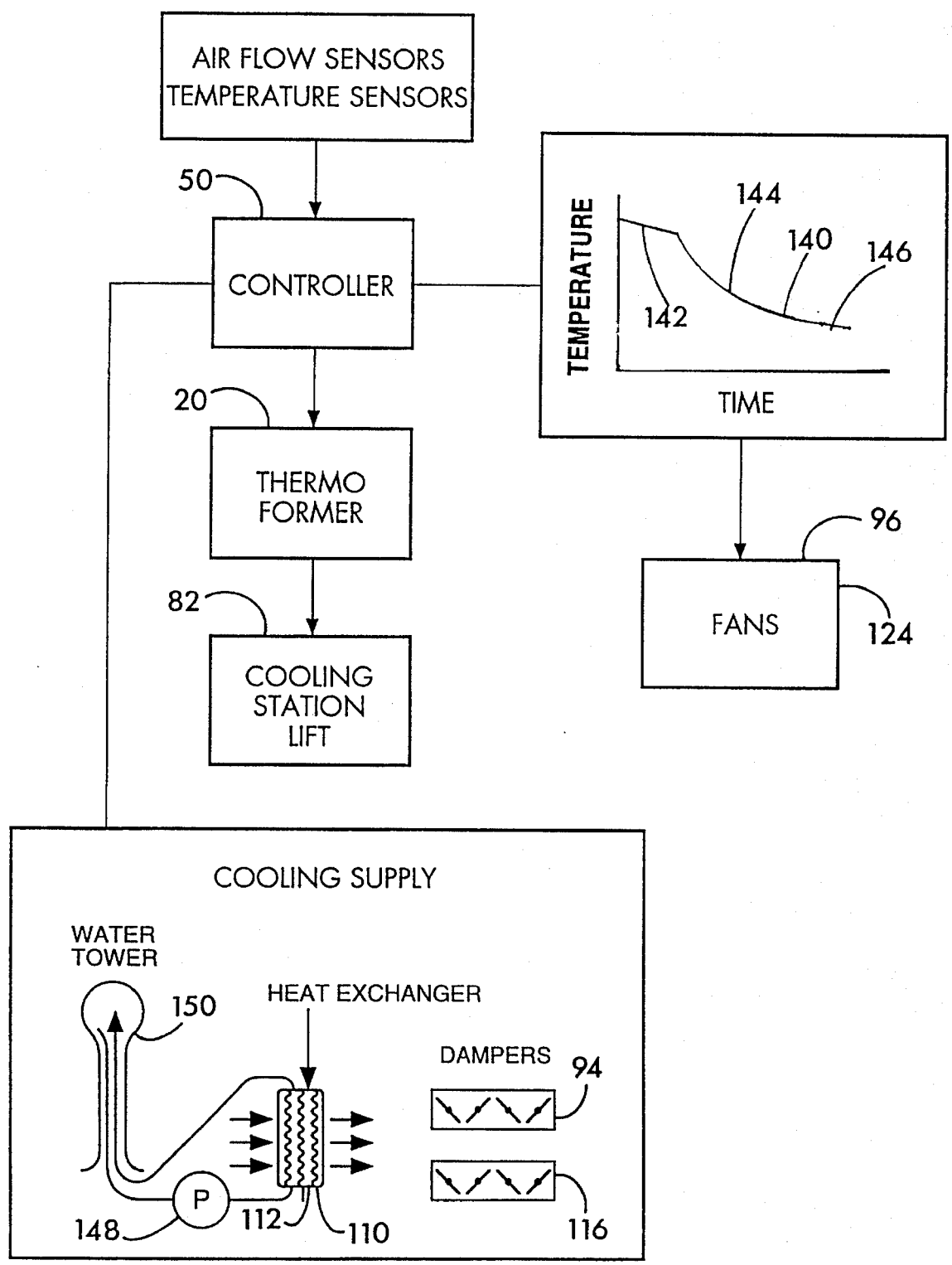
FIG. 3 is a schematic flow diagram of the controller of the thermoforming machine of this invention.

As shown in FIG. 3, water from a water tower 150 may be recirculated through a heat exchanger. It has been found, for example, that where groundwater temperatures are thirty five to sixty two degrees, sufficient cooling capability was available in the plant water tower to meet the requirements for cooling for at least one thermoformer. In practice, the available heat sink capabilities of the plant water supply system may be more than sufficient to operate a relatively large number of thermoformers in a given plant.

As shown in FIG. 1, outside air 90 may be mixed with return air (shown by arrows 114). The use of return air may be advantageous in the winter when the outside temperatures are well below that required for the cooling air. The use of return air is also advisable in the summer, where hot, moist exterior air may actually require more cooling than the exhaust air 140. The supply of exhaust air is controlled by a motor-driven damper 116 where it joins the mixing "T" 113.

The exhaust duct has an exhaust dump "T" 120 which is controlled by an exhaust dump damper 122 for the dumping of excessive exhaust air 114. The exhaust system is driven by an exhaust fan 124 which in turn is driven by an exhaust motor 126. The exhaust fan 124 and motor 126 may in some circumstances be eliminated so that the air supply system 86 requires only a single fan 96, thus achieving some economies through the use of only one somewhat more powerful fan.

The dampers 94, 116, 122 form a valve which controls the proportion of air which is recirculated versus the proportion which is ambient air drawn from the out side through the air intake 88.

Thermoforming machines are normally under the control of a controller. Although some functions of the thermoforming process may be under manual control, normally the process is entirely automatic. Once a sheet of plastic has been placed on the table 42 shown in FIG. 2, it is automatically elevated and clamped on the subframe 34. Thereafter, the carousel rotates under control of a controller through the various stations. The operation of the heaters is normally controlled by a sensor which detects the plastic temperature. Vacuumforming functions are normally controlled by a timed sequence.

In the thermoforming machine 20 employing a controlled cooling station 22, a programmable controller 50, shown in FIG. 3, may be utilized to optimize and control the cooling function. The controller receives inputs from sensors mounted within the air supply system 86. Intake air 90 is sensed by a temperature sensor 128 and a mixed air sensor 130. In addition, a temperature sensor 132 (after the upper heat exchanger 110) and a temperature sensor 134 (after the air passes through the lower heat exchanger 112) allow the controller to determine the temperature of the incoming air.

The temperature sensor 136 is installed in the exhaust duct 118 to sense the temperature of the recirculating air. A radiant energy sensor 138 is positioned to view the thermoformed article 48 so as to measure its surface temperature while in the cooling cavity 52. The controller 50 employs the information from the air sensors and from the temperature of the thermoformed item to control the cooling of the thermoformed article 48.

As illustrated in FIG. 3, the controller employs a cooling profile 140 for cooling the article 48 which has an initial cooling phase 142, a rapid cooling phase 144, and an end cooling phase 146.

The initial cooling phase 142 is accomplished by recycling the air in the supply system 86. When the article 48 first enters the cooling cavity after leaving the mold, the article is at its hottest, and even air warmer than ambient is much lower in temperature than the molded plastic. Thus in the initial phase the article is subjected to cooling by air which may be hotter than the desired end temperature. Utilizing only the heat sink capability of the recirculating air and the apparatus ductwork it has been found that the temperature of an article 48, such as a truck bedliner, can be reduced by up to forty degrees Fahrenheit during the initial cooling phase 142. The initial cooling phase 142 is the most critical as far as preventing distortion of the article 48 and therefore needs to be the most gradual The cooling ram is increased during the rapid cooling phase 144 by the use of a greater percentage of outside cooling air. The controller 50 determines the amount of outside air introduced into the cooling cavity by adjusting the outside air damper 94. If outside air is not sufficiently cool, cooling is accomplished through the heat exchangers 110 and 112.

Proper cooling air temperatures are obtained under the control of the controller 50. Adjustments are made for varying external supply air temperatures produced by seasonal and diurnal temperature variations by positioning of the dampers 94,116, 122. In the winter, when only very cold exterior air is available, the external supply air is mixed with some of the return air 114 and the excess return air 114 is dumped into the plant for heating through duct 120. Control of the dampers 94, 116, 122 and the heat exchangers 110,112 also allows the controller to cope with or adjust for different thermoformed products of varying gauges.

In the end cooling phase 146 of the cooling profile 140, the amount of cooling is reduced by adjusting the dampers to direct a greater amount of recirculated air onto the article, and shutting off the inflow of outside cooling air. After the end cooling phase, the article 48 leaves the thermoformer 20 at a uniform temperature, normally ninety degrees Fahrenheit.

The controller 50 also determines whether or not supplemental cooling through the heat exchangers 110, 112 is required. In this event, the water pump 148 is initiated, drawing cooling water from a reservoir 150 through the heat exchangers 110, 112. The typical flow of water in a typical application of the thermoforming machine 20, for example, thermoforming large truck bed liners, utilizes water at the rate of seventy gallons per minute to each heat exchanger 110, 112 where the water supply is at thirty-five to sixty-two degrees Fahrenheit.

The programmable controller 50 also controls the dampers 94, 116 which control the proportion of new versus recycled air introduced into the cooling cavity 52. The controller 50 may also receive other inputs, for example inputs from a heat exchanger or water temperature sensor, and position sensors on the dampers 94, 116, 104, 106 and 117. Further, in some instances it may be desirable to not only know air temperature and mass flow but air moisture content through the employment of a wet bulb temperature sensor. The controller will normally control the functions of the thermoformer 20 and control the opening and closing of the cooling cavity 52 and the elevation of the lift 82.

The cooling profile 140 employed by the controller 50 may be arrived at empirically and may be empirically adjusted by the operator for each change in condition. Preferably the cooling profile 140 will be in accordance with an algorithm which adjusts the profile in response to sensor inputs concerning air temperature and component temperatures. The control algorithm may also employ adaptive control algorithms which will seek to optimize various criteria. The control laws and algorithms will depend on the particular configuration of the thermoforming machine 20. If air conditioning is used as part of the cooling supply, it will be desirable to minimize the total air conditioning required. Considerations with regard to maximizing quality may dictate that the product be cooled as slowly as possible consistent with the cycle time available.

It should be understood that although the fans 96, 124 are described as fixed speed they could be variable speed, so air flow could be controlled by varying fan speeds. Alternatively, the fans could be constant speed and pitch with dampers or air by-passes used to control air flow.

It should be understood that the controlled cooling station could be incorporated into an in-line or clam-shell type thermoforming apparatus, or other types in addition to the rotary thermoformer described above.

It should also be understood that although the controlled cooling station is shown employed with a single sheet thermoformer, it could be employed to cool twin sheet thermoformed products.

Additionally, it should be understood that the a rotary thermoforming apparatus of this invention may form 30 or more parts per hour.

It should be understood that the invention is not limited to the particular construction and arrangement of parts herein illustrated and described, but embraces such modified forms thereof as come within the scope of the following claims.

We claim:

1. A machine for thermoforming a thick gauge thermoplastic sheet against a rigid mold, the machine comprising:

a) a frame;

b) a carriage mounted for movement on the frame;

c) at least one subframe connected to the carriage, wherein the subframe is engageable with a sheet;

d) a heating station mounted to the frame, wherein the subframe is movable through the heating station for heating of the sheet;

e) a forming station mounted to the frame, wherein the forming station has a thermoforming mold positioned to engage a heated sheet on the subframe which has traversed the heating station, and the mold being operable to mold the heated sheet to a desired shape; and f) a controlled cooling station mounted to the frame, the controlled cooling station including an upper portion, a lower portion, the upper and lower portions being relatively movable between a closed position wherein the upper and lower portions define a cavity which is adapted to surround the molded sheet to receive the molded sheet on the subframe after the forming station, and an opened position, a multiplicity of first ducts for introducing cooling air into the cavity to cool the molded sheet held in the subframe, each of the first ducts extending from one of the upper and lower portions to direct cooling air uniformly around the formed thermoplastic sheet, and at least one second duct extending from one of the upper and lower portions for removing heated air from the cavity, wherein the second duct is in fluid communication with the first ducts so recirculation of the cooling air can be effected.

2. The apparatus of claim 1 further comprising a load/unload station positioned after the controlled cooling station, wherein the molded and cooled sheet is accessible at the load/unload station from the apparatus exterior to remove the molded and cooled sheet from the subframe and to position an unprocessed sheet in the subframe for operation thereon by the apparatus.

3. The apparatus or claim 1 wherein the carriage is a carousel rotatably mounted to the frame and the sheet on the subframe describes a circular path as it moves through the apparatus.

4. The apparatus of claim 1 further comprising:
   a) a cool air supply duct in fluid communication with a supply of cool air and connected in fluid communication to the first ducts;
   b) an intake fan positioned in the cool air supply duct for blowing cooling air through the first ducts onto the molded sheet;
   c) at least one damper positioned in the cool air supply duct to selectably control the amount of recirculated and cool air introduced into the cooling cavity; and
   d) a programmable controller which controls the temperature of the cooling air which is directed through the first ducts by adjusting the damper.

5. The apparatus of claim 4 further comprising a sensor for detecting the temperature of the molded sheet within the controlled cooling station, wherein the programmable controller controls the temperature of the cooling air to achieve a selected end temperature of the molded sheet as detected by the sensor.

6. The apparatus of claim 4 wherein heat is removed from the cooling air by a heat exchanger.

7. The apparatus of claim 4 wherein heat is removed from the cooling air by the addition of cool ambient air to the cooling air.

8. A rotary thermoforming apparatus for molding at least one thick gauge sheet of thermoplastic material, the apparatus comprising:
   a) a frame;
   b) a carriage mounted to the frame for rotary motion;
   c) at least one subframe mounted to the carriage which releasably engages a sheet;
   d) heaters mounted on the frame and positioned to heat the sheet when the carriage is rotated to bring the subframe into proximity thereto;
   e) a thermoforming mold mounted on the frame and spaced from the heaters, wherein the heated sheet is rotatable on the carriage away from the heaters to be formed by the mold into a desired shape; and
   f) a cooling cavity mounted on the frame and spaced from the thermoforming mold, the cooling cavity having at least one duct mounted therein to discharge cooling air onto a molded sheet engaged by the subframe which has been displaced from the thermoforming mold by the carriage, and at least one duct opening into the cavity for removing heated cooling air.

9. The apparatus of claim 8 further comprising a controller and a first sensor for detecting the temperature of the molded sheet within the cooling cavity, wherein the controller receives temperature data from the first sensor and controls the temperature of the cooling air to achieve a selected end temperature of the molded sheet.

10. The apparatus of claim 8 wherein the cooling cavity comprises:
    a) an upper portion having at least one duct which discharges cooling air above the molded sheet engaged on the subframe; and
    b) a lower portion having at least one duct below the molded sheet, wherein the lower portion is movable vertically with respect to the upper portion to at least partially enclose the molded sheet to facilitate cooling thereof.

11. The apparatus of claim 10 wherein the lower portion has a lower surface and an upwardly extending peripheral wall, and wherein the lower portion is movable between an opened position in which the subframe is free to pass between the upper portion and the lower portion into the cooling cavity, and a closed position in which the lower portion engages against the upper portion so that the upper and lower portions are adapted to enclose the molded sheet for cooling.

12. The apparatus of claim 8 further comprising a load/unload station positioned after the cooling cavity, wherein the molded and cooled sheet is accessible from the apparatus exterior to remove a molded sheet from the subframe and to position an unprocessed sheet in the frame for operation thereon by the apparatus.

13. A rotary thermoforming apparatus for molding at least one thick gauge sheet of thermoplastic material, the apparatus comprising:
    a) a frame;
    b) a carriage mounted to the frame for rotary motion;
    c) at least one subframe mounted to the carriage which releasably engages a sheet;
    d) a load/unload station on the frame which is accessible from the apparatus exterior to allow the mounting of a sheet of thermoplastic material on the subframe and to permit the removal of a molded sheet therefrom;
    e) heaters positioned on the frame after the load/unload station for heating the sheet when the carriage is rotated to bring the subframe into proximity thereto;
    f) a thermoforming mold on the frame and spaced from the heaters, wherein the heated sheet is rotatable on the carriage away from the heaters to be formed by the mold into a desired shape; and
    g) a cooling cavity on the frame and spaced from the thermoforming mold, the cooling cavity having an upper portion and a lower portion each having ducts which discharge cooling air into the cavity onto a molded sheet engaged by the subframe which has been displaced from the mold by the carriage, wherein the upper and lower portions are moveable vertically with respect to one another to alternatively enclose the molded sheet for cooling and to open to permit the cooled molded sheet to pass to the load/unload station.

14. A rotary thermoforming apparatus for molding at least one thick gauge sheet of thermoplastic material, the apparatus comprising:
    a) a frame;
    b) a carriage mounted to the frame for rotary motion;
    c) at least one subframe mounted to the carriage which releasably engages a sheet;
    d) heaters positioned on the frame to heat the sheet when the carriage is rotated to bring the subframe into proximity thereto;
    e) a thermoforming mold on the frame and spaced from the heaters, wherein the heated sheet is rotatable on the carriage away from the heaters to be formed by the mold into a desired shape; and
    f) a controlled cooling station mounted to the frame, wherein the controlled cooling station has a cavity which is adapted to surround the molded sheet to receive the molded sheet on the subframe, at least one first duct in fluid communication with the cavity for introducing cooling air into the cavity to cool the molded sheet held in the subframe, and at least one second duct in fluid communication with the cavity for removing heated air from the cavity and wherein the second duct is in fluid communication with the first duct;

g) a fan disposed in the first duct for moving cooling air to the cavity;

h) an air intake in fluid communication with the first duct for intaking ambient air for cooling;

i) a valve disposed between the first duct and the second duct, the valve controlling the mixture of the ambient air and heated air from the second duct, the mixture of the ambient air and heated air being supplied as the cooling air to the cavity.

15. The apparatus of claim 14 wherein the cooling station has an upper portion which is fixed, and a positionable lower portion which has a lower surface with an upwardly extending peripheral wall, and a lower duct which extends from the lower surface to direct cooling air uniformly around the molded sheet.

16. The apparatus of claim 14 further comprising a load/unload station positioned on the frame and after the controlled cooling station, wherein the molded and cooled sheet is accessible at the load/unload station from the apparatus exterior to remove a molded sheet from the subframe and to position an unprocessed sheet in the frame for operation thereon by the apparatus.

17. The apparatus of claim 14 further comprising at least one heat exchanger mounted within the first duct for cooling the cooling air.

18. The apparatus of claim 14 further comprising a heated air dump connected to the second duct for dumping excess heated air which is not recirculated.

19. The apparatus of claim 14 further comprising:

a programmable controller which controls the temperature of the cooling air which is directed through the first duct by adjusting the valve.

20. The apparatus of claim 19 further comprising a sensor for detecting the temperature of the molded sheet within the controlled cooling station, wherein the programmable controller is operably connected to the sensor to receive input therefrom and controls the temperature of the cooling air to achieve a selected end temperature of the molded sheet as detected by the sensor.

21. A thermoforming machine comprising:

a frame, a carriage supported on the frame for movement relative thereto, the carriage including a subframe, the subframe being engageable with a thermoplastic sheet to be molded in the thermoforming machine, a heating station mounted on the frame, the subframe being positionable in the heating station to heat the thermoplastic sheet, a forming station mounted on the frame, the forming station including a mold, the mold being engageable with the thermoplastic sheet to form the sheet into a molded article, and a cooling station mounted on the frame and separate from the forming station, the cooling station being movable between an opened position so that the molded article can be received at the cooling station, and a closed position, the cooling station, when in the closed position, defining a cavity adapted to enclose the molded article, and the cooling station including an inlet for introducing cooling air into the cavity for circulation around a molded article received in the cavity, and an outlet for discharging cooling air from the cavity.

22. A thermoforming machine as set forth in claim 21 wherein the cooling station includes upper and lower plenums, the upper and lower plenums being movable relative to each other to open and close the cooling station, and wherein the inlet includes a plurality of cooling air vents, the vents being spaced about the cavity when the cooling station is closed, and each of the vents being positioned on one of the upper and lower plenums.

23. A thermoforming machine as set forth in claim 22 wherein the cooling station includes means between the upper and lower plenums for sealing the cavity when the cooling station is closed.

24. A thermoforming machine as set forth in claim 22 wherein the cooling station includes means for supporting the molded article as it is cooled to prevent distortion of the molded article during cooling.

25. A thermoforming machine as set forth in claim 22 wherein the lower plenum includes a support rack for supporting the molded article as it is cooled to prevent distortion of the molded article during cooling.

26. A thermoforming machine as set forth in claim 22 wherein at least some of the vents include means for preventing direct impingement of cooling air on a molded part received in the cavity to prevent localized areas of cooling on the molded part.

27. A thermoforming machine as set forth in claim 21 wherein the cooling station includes means for circulating cooling air around a molded article received in the cavity, the means for circulating cooling air including the inlet and the outlet.

28. A thermoforming machine as set forth in claim 21 wherein the cooling station includes an upper portion, a lower portion, the upper and lower portions being movable relative to one another between a first position wherein the cooling station is in the closed position and the upper and lower portions define the cavity, and a second position wherein the cooling station is in the opened position, and an air supply system including a supply duct connected to one of the upper and lower portions for supplying cooling air to the cavity, the supply duct being in fluid communication with the inlet, and a return duct connected to one of the upper and lower portions for removing cooling air from the cavity, the return duct being in fluid communication with the outlet.

29. A thermoforming machine as set forth in claim 28 wherein each of the upper and lower portions includes a plurality of air vents all in fluid communication with the supply duct for introducing cooling air into the cavity, the air vents forming the inlet.

30. A thermoforming machine as set forth in claim 29 wherein the return duct is connected to the supply duct so recirculation of the cooling air can be effected, and wherein the air supply system includes means for controlling air flow into the cavity and for controlling cooling air temperature, the means for controlling air flow and air temperature including a first damper positioned in the supply duct for regulating air entry into the cavity, and a valve at the juncture of the supply and return ducts for regulating the amount of recirculated air that is recycled as cooling air.

31. A thermoforming machine as set forth in claim 30 wherein the means for controlling air flow and air temperature includes a temperature sensor positioned in the supply duct, and a programmable controller operably connected to the temperature sensor and the dampers.

* * * * *